Figure 1:
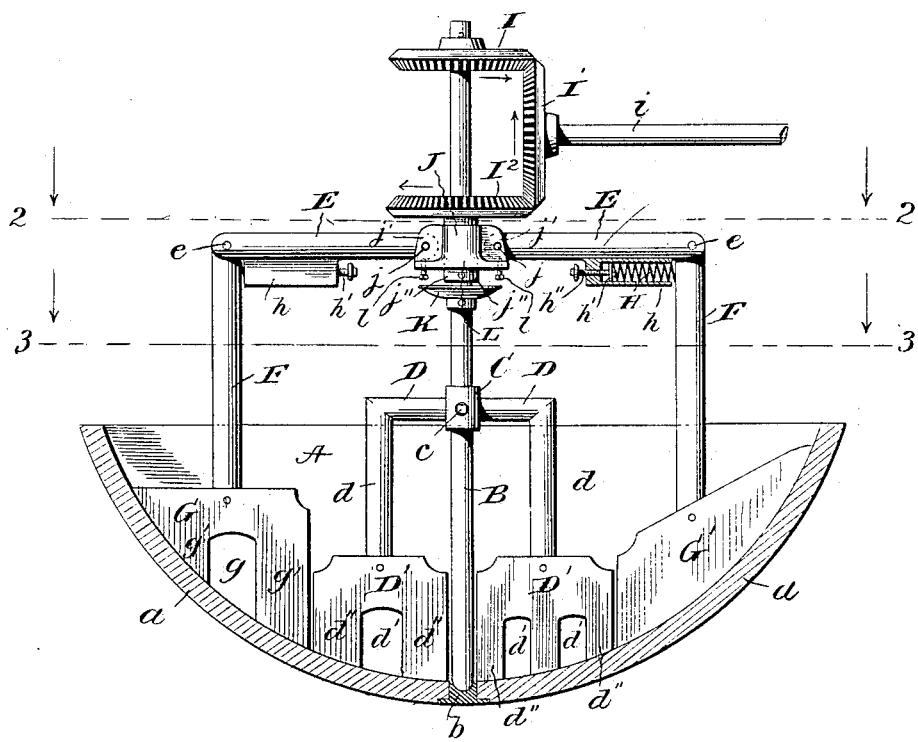

No. 758,746. PATENTED MAY 3, 1904.
J. F. GANDOLFO.
MIXER.
APPLICATION FILED JUNE 8, 1903.
NO MODEL. 2 SHEETS—SHEET 1.

Witnesses: Inventor:
Jas. E. Hutchinson John F. Gandolfo,
K. E. Montague By Bacon & Milans
Attys.

No. 758,746. PATENTED MAY 3, 1904.
J. F. GANDOLFO.
MIXER.
APPLICATION FILED JUNE 8, 1903.
NO MODEL. 2 SHEETS—SHEET 2.
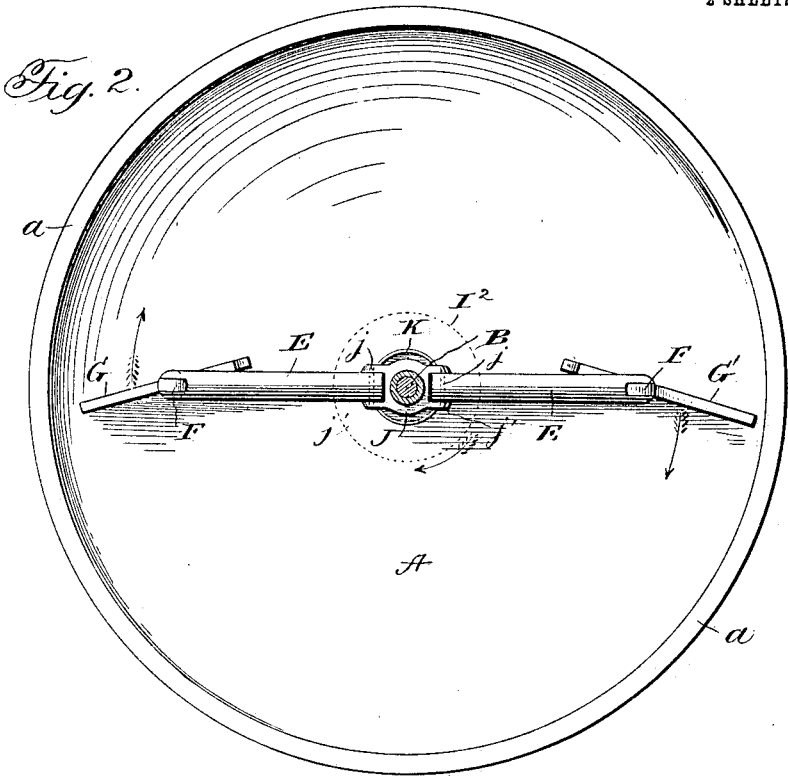
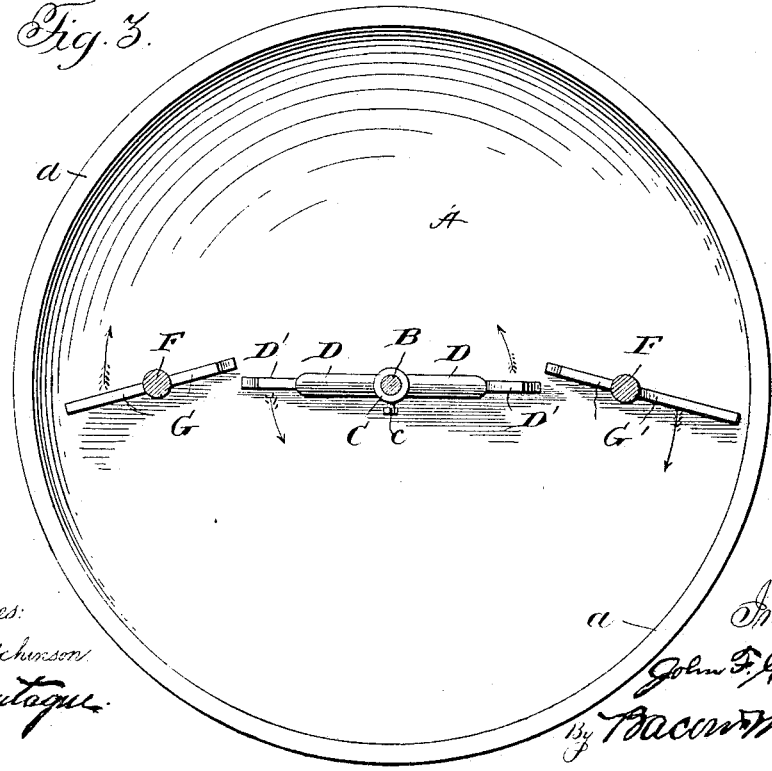

No. 758,746. Patented May 3, 1904.

UNITED STATES PATENT OFFICE.

JOHN F. GANDOLFO, OF DUBUQUE, IOWA.

MIXER.

SPECIFICATION forming part of Letters Patent No. 758,746, dated May 3, 1904.

Application filed June 8, 1903. Serial No. 160,653. (No model.)

*To all whom it may concern:*

Be it known that I, JOHN F. GANDOLFO, a citizen of the United States, residing at Dubuque, in the county of Dubuque and State of Iowa, have invented certain new and useful Improvements in Mixers, of which the following is a specification, reference being had therein to the accompanying drawings.

This invention relates to an improvement in mixers, and contemplates the provision of a device or machine of this character primarily adapted for use in making cake or bread dough, but also susceptible of employment in connection with the mixing of other materials, as will be apparent to those familiar with this class of inventions.

Novel details in the construction and arrangement of the several parts of the mixer will be clearly understood from the detailed description hereinafter when read in connection with the accompanying drawings, forming part hereof and wherein an embodiment of the invention is illustrated. It is, however, to be understood that the invention is not to be limited to any special details, excepting in so far as any such may be included in the hereto appended claims.

In the drawings, Figure 1 is a side elevation of the mixer as applied to a bowl, the bowl being shown in section. Fig. 2 is a section on the line 2 2 of Fig. 1, and Fig. 3 is a section on the line 3 3 of Fig. 1.

A designates a bowl, preferably of the ordinary wooden type, used for mixing cake or bread dough therein, the bottom of which is rounded, as at $a$, and provided centrally with a metallic bearing $b$ for the lower end of the rotatable shaft B. At a point intermediate the ends of the shaft B a collar C is adjustably secured thereto by a binding-bolt $c$. This collar carries oppositely-disposed arms D of angular or elbow shape, the vertical portions $d$ of which carry at their free ends paddles or beater-blades D', said blades being generally of the same type, but provided with differently-arranged cut-away portions $d'$ to provide fingers $d''$, the peculiar arrangement of the fingers of one blade relative to the fingers on the opposite blade permitting the travel thereof in contrary circular paths, thereby affording more thorough mixing of the material being operated upon. The blades just described are located near the center of the bowl and occupy an approximately vertical plane, whereby the tendency thereof in operation is to throw the dough or material by centrifugal force outward toward the edge or the outer portion of the bowl.

At a convenient distance above the collar C the shaft B supports horizontally-disposed arms E, projecting from the shaft in opposite directions, and to the free ends of which vertically-disposed rods F are pivoted at $e$. Blades G G' are respectively secured to the lower end of one of the rods F, the blade G being cut away at $g$ to provide projecting portions $g'$, while the blade G' is intact throughout. The lower edges of all of the paddles and blades are curved to substantially conform to the curvature of the inner surface of the bowl; but to permit of an automatic adjustment of the blades G G' to correspond to any irregularities in the surface of the bowl incident to warping of the same when formed of wood or similar material or bending of the same when formed of metal springs H are secured through the medium of proper housings or boxes $h$ to the lower surface of the arms E E, the outer ends of the housings being open, so that said springs may exert a constant outward pressure upon the rods F, the tension of the springs being adjustable by plates $h'$ and screw-threaded bolts $h''$, operatively associated therewith, extending through the rear end of the housings. It will thus be seen that the arms F are always forced apart, so as to maintain a close engagement with the surface of the bowl. The blade G is arranged at an inclination, Fig. 3, whereby during the rotation of the device the dough will be thrown thereby in an upward and outward direction, the blade G' being arranged at a directly opposite inclination, whereby the dough is forced in a downward and inward direction, the result of this arrangement being that the material will be thoroughly worked and mixed.

It is desirable that the travel of the blades G G' be in a direction reverse to that of the paddles D', and to effect this operation the blades are actuated by the following means: Near the upper end of the shaft B a beveled gear I is secured, which is always in mesh with a corresponding gear I', secured to the power-shaft $i$, which may be operated from any suitable source. The operation of the gear I' in the direction of the arrow, Fig. 1, will in turn operate the gear I and shaft B, and the arms D being secured directly to the shaft, as stated, the blades D' will be carried around therewith. The arms E are pivoted at their inner ends by pins $j$ to ears $j''$ on a collar J, said collar being loose upon the shaft B and rotatable independently thereof by a beveled gear $I^2$, in mesh with the operating-gear I', so that the gear $I^2$ will be rotated in a direction opposite to the rotation of the gear I, whereby the blades G G' will be correspondingly operated relative to the blades D'. The collar J is held against longitudinal movement on the shaft B by a ring $j'''$, arranged therebeneath and clamped directly to said shaft.

An oil-cup K is secured to the shaft B beneath the operating parts of the device, whereby any lubricant escaping therefrom may be caught by said cup.

The arms E may be adjusted by means of screw-threaded bolts $l$, passing upwardly through the flange L, projecting outwardly from the collar J, the said bolts being arranged to impinge upon the lower surfaces of said arms E.

Having thus described the invention, what is claimed as new, and desired to be secured by Letters Patent, is—

1. In a mixer, operating means, and mixing-blades pivotally connected therewith and free to swing during the operation of the mixer, said blades being arranged to travel in a rotary direction and in an approximately horizontal plane.

2. In a mixer, operating means, and spring-pressed blades pivotally connected therewith and free to swing during the operation of the mixer.

3. In a mixer, operating means, spring-controlled blades pivotally connected therewith and free to swing during the operation of the mixer, and means whereby the controlling-spring may be adjusted.

4. In a mixer, operating means, a horizontally-disposed arm connected therewith, and a blade pivoted to said arm, said blade being arranged to travel in a rotary direction and in an approximately horizontal plane.

5. In a mixer, operating means, a horizontally-disposed arm connected therewith, and a spring-pressed blade pivoted to said arm.

6. In a mixer, operating means, a horizontally-disposed arm connected therewith, and spring-controlled blade pivoted to said arm, and means whereby the controlling-spring may be adjusted.

7. In a mixer, operating means, a horizontally-disposed arm connected therewith, a rod pivoted to said arm, and a blade carried by said rod, said blade being arranged to travel in a rotary direction and in an approximately horizontal plane.

8. In a mixer, operating means, a horizontally-disposed arm connected therewith, a spring-pressed rod pivoted to said arm, and a blade carried by said rod.

9. In a mixer, operating means, a horizontally-disposed arm connected therewith, a spring-controlled rod pivoted to said arm, and a blade carried by said rod, and means whereby the controlling-spring may be adjusted.

10. In a mixer, operating means, a horizontally-disposed arm pivotally connected therewith, and a blade pivoted to said arm.

11. In a mixer, operating means, a horizontally-disposed arm pivotally connected therewith, and a spring-pressed blade pivoted to said arm.

12. In a mixer, operating means, a horizontally-disposed arm pivotally connected therewith, and a yieldable blade pivoted to said arm.

13. In a mixer, operating means, a horizontally-disposed arm pivotally connected therewith, a rod pivoted to said arm, and a blade carried by said rod.

14. In a mixer, operating means, a horizontally-disposed arm pivotally connected therewith, a spring-pressed rod pivoted to said arm, and a blade carried by said rod.

15. In a mixer, operating means, a horizontally-disposed arm pivotally connected therewith, a yieldable rod pivoted to said arm, and a blade carried by said rod.

16. In a mixer, operating means, a horizontally-disposed arm pivotally connected therewith, a blade pivoted to said arm, and adjusting means for said horizontally-disposed arm.

17. In a mixer, operating means, a horizontally-disposed arm pivotally connected therewith, a spring-pressed blade pivoted to said arm, and adjusting means for said horizontally-disposed arm.

18. In a mixer, operating means, a horizontally-disposed arm pivotally connected therewith, a yieldable blade pivoted to said arm, and adjusting means for said horizontally-disposed arm.

19. In a mixer, operating means, a horizontally-disposed arm pivotally connected therewith, a rod pivoted to said arm, a blade carried by said rod, and adjusting means for said horizontally-disposed arm.

20. In a mixer, operating means, a horizontally-disposed arm pivotally connected therewith, a spring-pressed rod pivoted to said arm, a blade carried by said arm, and adjusting means for said horizontally-disposed arm.

21. In a mixer, operating means, a horizontally-disposed arm pivotally connected therewith, a yieldable rod pivoted to said arm, a blade carried by the said rod, and adjusting means for said horizontally-disposed arm.

22. In a mixer, a bowl having a curved bottom, a supporting device operatively associated therewith, operating means, on said supporting device, a plurality of blades connected therewith, the lower edges of all of said blades forming an approximately regular curve, and means whereby the blades may yield to automatically adjust themselves to the bottom of the bowl when in operation.

23. In a mixer, operating means, and a pair of blades connected therewith, means for rotating both blades in the same direction, said blades being inclined in opposite directions whereby the material being operated upon is thrown up and then down.

24. In a mixer, an inner blade and a series of outer blades, in combination with operating means for rotating the inner and outer blades, the path of movement of all of the outer blades being outside of the inner blade, the lower edges of all of the blades coöperating to form a substantially regular curve.

In testimony whereof I affix my signature in presence of two witnesses.

JOHN F. GANDOLFO.

Witnesses:
R. E. WILKINSON,
M. W. RYAN.